United States Patent
Spry et al.

(10) Patent No.: US 10,496,152 B2
(45) Date of Patent: Dec. 3, 2019

(54) POWER CONTROL TECHNIQUES FOR INTEGRATED PCIE CONTROLLERS

(71) Applicant: Intel Corporation, Santa Clara, CA (US)

(72) Inventors: Bryan L. Spry, Portland, OR (US); Lily P. Looi, Portland, OR (US); Shaun M. Conrad, Cornelius, OR (US)

(73) Assignee: INTEL CORPORATION, Santa Clara, CA (US)

( * ) Notice: Subject to any disclaimer, the term of this patent is extended or adjusted under 35 U.S.C. 154(b) by 1547 days.

(21) Appl. No.: 14/040,316

(22) Filed: Sep. 27, 2013

(65) Prior Publication Data

US 2015/0095687 A1 Apr. 2, 2015

(51) Int. Cl.
*G06F 13/24* (2006.01)
*G06F 1/3287* (2019.01)
*G06F 1/3234* (2019.01)

(52) U.S. Cl.
CPC .......... *G06F 1/3287* (2013.01); *G06F 1/3253* (2013.01); *G06F 1/3278* (2013.01); *Y02D 10/151* (2018.01); *Y02D 10/157* (2018.01); *Y02D 10/171* (2018.01); *Y02D 50/20* (2018.01)

(58) Field of Classification Search
CPC ......... G06F 13/36; G06F 13/38; G06F 13/385
USPC ................... 710/105, 305–306; 713/300–344
See application file for complete search history.

(56) References Cited

U.S. PATENT DOCUMENTS

| | | | |
|---|---|---|---|
| 2007/0156492 A1 | 7/2007 | Gough | |
| 2010/0293402 A1 | 11/2010 | Marinkovic et al. | |
| 2013/0086400 A1* | 4/2013 | Teoh | G06F 1/3253 713/320 |
| 2014/0025947 A1* | 1/2014 | Jaber | G06F 21/572 713/164 |

FOREIGN PATENT DOCUMENTS

| | | |
|---|---|---|
| JP | 2007122714 | 5/2007 |
| JP | 2010211351 | 9/2010 |
| JP | 2011008310 | 1/2011 |
| JP | 2011509446 | 3/2011 |

OTHER PUBLICATIONS

Office Action received for Japanese Patent Application No. 2016-536514, dated Feb. 7, 2017, 10 pages including 5 pages English translation.
Office Action received for Korean Patent Application No. 10-2016-7003666, dated Mar. 21, 2017, 10 pages including 3 pages English translation.
Extended European Search Report received for European Patent Application No. 14849812.4, dated Apr. 7, 2017, 9 pages.

* cited by examiner

*Primary Examiner* — Thomas J. Cleary
*Assistant Examiner* — Kim T Huynh

(57) ABSTRACT

Improved power control techniques for integrated peripheral component interconnect express (PCIe) controllers are described. In one embodiment, for example, a processor circuit may comprise an integrated PCIe controller and logic to detect a power reduction trigger, disable the integrated PCIe controller, and remove power from the integrated PCIe controller based on a power removal setting for the integrated PCIe controller. Other embodiments are described and claimed.

25 Claims, 8 Drawing Sheets

*FIG. 5*

Storage Medium 500

*Computer Executable Instructions for 300*

*Computer Executable Instructions for 400*

POWER CONTROL TECHNIQUES FOR INTEGRATED PCIE CONTROLLERS

TECHNICAL FIELD

Embodiments described herein generally relate to computing systems and computing system power control techniques.

BACKGROUND

In a typical computing system, the power consumption associated with establishing and maintaining a peripheral component interconnect (PCI) express (PCIe) communications link between a processor circuit and a peripheral device such as a graphics card can be significant. Under circumstances in which limited power is available and the features of the PCIe peripheral are non-essential and/or may be performed by an integrated alternative device, it may be desirable to deactivate the PCIe peripheral and remove power from a PCIe controller and/or other circuitry supporting the PCIe link. For example, in systems in which the PCIe controller is integrated within the processor circuit, it may be desirable to remove power from the PCIe controller and/or other supporting circuitry in order to enable the processor circuit to enter a lower power state. However, according to conventional approaches, while an integrated PCIe controller may be disabled, no procedure is established by which an integrated PCIe controller can be powered down in the course of ongoing operation of a processor circuit within which it resides.

BRIEF DESCRIPTION OF THE DRAWINGS

FIG. 5 illustrates one embodiment of a storage medium.

DETAILED DESCRIPTION

Various embodiments may be generally directed to power control techniques for integrated PCIe controllers. More particularly, various embodiments are directed to techniques to enable the removal of power from an integrated PCIe controller. In one embodiment, for example, a processor circuit may comprise an integrated PCIe controller and logic to detect a power reduction trigger, disable the integrated PCIe controller, and remove power from the integrated PCIe controller based on a power removal setting for the integrated PCIe controller. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
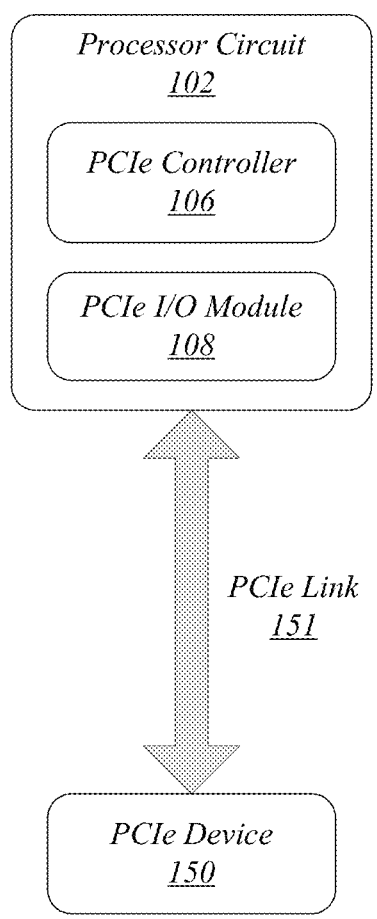
FIG. 1 illustrates one embodiment of an operating environment.

FIG. 1 illustrates an embodiment of an operating environment 100 such as may be representative of various embodiments. As shown in FIG. 1, a processor circuit 102 communicates with a PCIe device 150 over a PCIe link 151. In order to support communication with PCIe device 150, processor circuit 102 comprises an integrated PCIe controller 106 and an integrated PCIe input/output (I/O) module 108. In some embodiments, PCIe controller 106 may comprise circuitry operative to manage and/or configure PCIe device 150, and/or to manage and/or configure transaction and/or data layer communications between processor circuit 102 and PCIe device 150 via PCIe link 151. In various embodiments, PCIe I/O module 108 may comprise circuitry operative to manage and/or configure communications between processor circuit 102 and PCIe device 150 at a lower abstraction layer than PCIe controller 106. For example, in some embodiments, PCIe I/O module 108 may be operative to manage and/or configure physical layer communications between processor circuit 102 and PCIe device 150 via PCIe link 151. The embodiments are not limited in this context.

During operation, PCIe controller 106, PCIe I/O module 108, and/or PCIe device 150 may each consume power. In various embodiments, the power consumed by PCIe controller 106 and PCI I/O module 108 may comprise a portion of the overall power consumed by processor circuit 102. In some embodiments, it may become desirable to transition processor circuit 102 into a lower power state, in which its overall power consumption level is reduced. In various embodiments, in order to enable transition into the lower power state, it may be desirable to remove power from PCIe controller 106 and/or PCIe I/O module 108. One potential approach to removing power from PCIe controller 106 and/or PCIe I/O module 108 may comprise power gating PCIe controller 106 and/or PCIe I/O module 108. However, while some conventional systems enable the removal of power from PCIe devices such as PCIe device 150, they do not support the removal of power from PCIe components such as PCIe controller 106 and PCIe I/O module 108.

Figure 2:
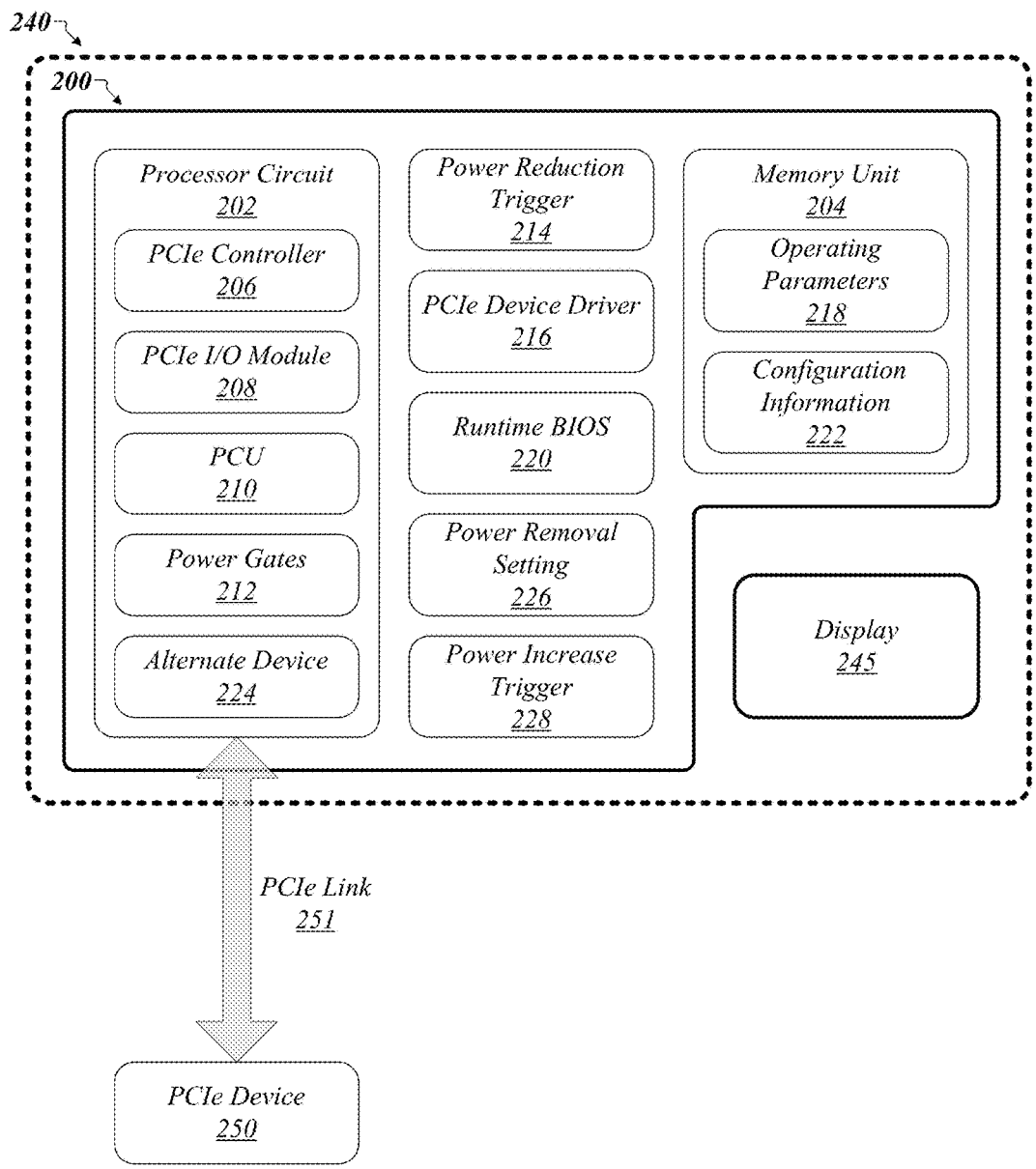
FIG. 2 illustrates one embodiment of an apparatus and one embodiment of a first system.

FIG. 2 illustrates a block diagram of an apparatus 200. Apparatus 200 comprises an example of an apparatus that may support the removal of power from PCIe components such as PCIe controller 106 and/or PCIe I/O module 108 of FIG. 1. As shown in FIG. 2, apparatus 200 comprises multiple elements including a processor circuit 202 and a memory unit 204. The embodiments, however, are not limited to the type, number, or arrangement of elements shown in this figure.

In some embodiments, apparatus 200 may comprise processor circuit 202. Processor circuit 202 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 202 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 202 may be implemented as a general purpose processor, such as a processor made by Intel® Corporation, Santa Clara, Calif. The embodiments are not limited in this context.

In various embodiments, apparatus 200 may comprise or be arranged to communicatively couple with a memory unit 204. Memory unit 204 may be implemented using any machine-readable or computer-readable media capable of storing data, including both volatile and non-volatile memory. For example, memory unit 204 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 204 may be included on the same integrated circuit as processor circuit 202, or alternatively some portion or all of memory unit 204 may be disposed on an integrated circuit or other medium, for example a hard disk drive, that is external to the integrated circuit of processor circuit 202. Although memory unit 204 is comprised within apparatus 200 in FIG. 2, memory unit 204 may be external to apparatus 200 in some embodiments. The embodiments are not limited in this context.

In some embodiments, processor circuit 202 may comprise a PCIe controller 206. PCIe controller 206 may comprise circuitry operative to manage and/or configure a PCIe device 250, and/or to manage and/or configure transaction and/or data layer communications between processor circuit 202 and PCIe device 250, and may be the same as or similar to PCIe controller 106 of FIG. 1. In various embodiments, processor circuit 202 may comprise a PCIe I/O module 208. PCIe I/O module 208 may comprise circuitry operative to manage and/or configure communications between processor circuit 202 and PCIe device 250 at a lower abstraction layer than PCIe controller 206, and may be the same as or similar to PCIe I/O module 108 of FIG. 1. For example, in some embodiments, PCIe I/O module 208 may be operative to manage and/or configure physical layer communications between processor circuit 202 and PCIe device 250. In various embodiments, PCIe controller 206 and PCIe I/O module 208 may collectively be operative to establish, train, manage, configure, and/or maintain a PCIe link 251 between processor circuit 202 and PCIe device 250. In some embodiments, processor circuit 202 and PCIe device 250 may be operative to communicate over PCIe link 251 according to one or more PCIe communications protocols. The embodiments are not limited in this context.

In various embodiments, processor circuit 202 may comprise a power control unit (PCU) 210. PCU 210 may comprise a combination of circuitry, logic, and/or instructions operative to control and/or manage the provision of power to one or more components of processor circuit 202.

In some embodiments, PCU 210 may be operative to control and/or manage the provision of power to PCIe controller 206 and/or PCIe I/O module 208. In various such embodiments, PCU 210 may be operative to control and/or manage the provision of power to PCIe controller 206 and/or PCIe I/O module 208 by controlling one or more power gates 212. Each power gate 212 may comprise a transistor, device, or circuit that PCU 210 may set into an open state in order to remove power or set into a closed state in order to provide power to one or more components of processor circuit 202. In some embodiments, PCU 210 may be operative to control the provision of power to PCIe controller 206 using one power gate 212, and may be operative to control the provision of power to PCIe I/O module 208 using another power gate 212. In various other embodiments, PCU 210 may be operative to control the provision of power to both PCIe controller 206 and PCIe I/O module 208 using one power gate 212. The embodiments are not limited in this context.

FIG. 2 also illustrates a block diagram of a system 240. System 240 may comprise any of the aforementioned elements of apparatus 200. System 240 may further comprise a display 245. Display 245 may comprise any display device capable of displaying information received from processor circuit 202. Examples for display 245 may include a television, a monitor, a projector, and a computer screen. In one embodiment, for example, display 245 may be implemented by a liquid crystal display (LCD), light emitting diode (LED) or other type of suitable visual interface. Display 245 may comprise, for example, a touch-sensitive display screen ("touchscreen"). In various implementations, display 245 may comprise one or more thin-film transistors (TFT) LCD including embedded transistors. The embodiments, however, are not limited to these examples.

During operation of apparatus 200 and/or system 240, it may become desirable to reduce an overall power consumption level thereof. In an example embodiment, apparatus 200 and/or system 240 may comprise a portable computing device operating using a connection to an external power supply. If the connection to the external power supply is removed, apparatus 200 and/or system 240 may depend on a battery for power, and it may desirable to reduce the power consumption level of apparatus 200 and/or system 240 in order to increase an amount of time that apparatus 200 and/or system 240 may operate before the battery power is exhausted. The embodiments are not limited to this example.

In various embodiments, processor circuit 202 may be operative to detect a power reduction trigger 214. In some embodiments, the power reduction trigger 214 may comprise information and/or signals indicating the existence of circumstances under which a reduction in power consumption is desirable. In an example embodiment, processor circuit 202 may be operative to detect a power reduction trigger 214 indicating that an external power supply connection has been removed and thus that apparatus 200 and/or system 240 are running on battery power. It is worthy of note that in various embodiments, power reduction trigger 214 may simply comprise a result of one or more calculations performed by processor circuit 202, and processor circuit 202 may detect power reduction trigger 214 by performing the one or more calculations and identifying the result. In an example of such an embodiment, processor circuit 202 may be operative to compare a current power consumption level with a target power consumption level, and power reduction trigger 214 may comprise a result determined by processor circuit 202 and indicating that the current power consumption level is greater than the target power consumption level. The embodiments are not limited to these examples.

In some embodiments, based on power reduction trigger 214, processor circuit 202 may determine that power should be removed from PCIe controller 206 and/or PCIe I/O module 208 in order to enable transition of processor circuit 202 into a lower power state. In various embodiments, a process for removing power from PCIe controller 206 and/or PCIe I/O module 208 may begin with a determination of one or more PCIe devices being served by PCIe controller 206 and/or PCIe I/O module 208. In the example of FIG. 2, PCIe controller 206 may determine that PCIe device 250 is being served by PCIe controller 206 and/or PCIe I/O module 208 via PCIe link 251. For purposes of clarity and brevity, the following discussion shall pertain to scenarios in which PCIe controller 206 and PCIe I/O module 208 serve the single PCIe device 250 depicted in FIG. 2. However, it is to be understood that embodiments are both possible and contemplated in which PCIe controller 206 and/or PCIe I/O module 208 serve multiple PCIe devices, and the embodiments are not limited in this context.

In some embodiments, once PCIe device 250 has been identified, processor circuit 202 may be operative to invoke one or more routines of a PCIe device driver 216, which may comprise a driver for PCIe device 250. More particularly, processor circuit 202 may be operative to invoke one or more routines of PCIe device driver 216 that are operative to store or otherwise preserve one or more operating parameters 218 associated with operation of PCIe device 250. In various embodiments, operating parameters 218 may comprise logic, data, information, and/or instructions generated, received, processed, modified, sent, or otherwise utilized by PCIe device 250 during operation. In some embodiments, operating parameters 218 may comprise information used by PCIe device 250 to implement one or more features and/or functions thereof. For example, if PCIe device 250 comprises a graphics card, operating parameters 218 may comprise graphics information generated by PCIe device 250 for placement in a graphics frame buffer. In various embodiments, operating parameters 218 may additionally or alternatively comprise configuration information for PCIe device 250. In the aforementioned example in which PCIe device 250 comprises a graphics card, operating parameters 218 may comprise information indicating a value of a resolution setting and a value of a refresh rate setting based on which PCIe device 250 generates graphics information. The embodiments are not limited to these examples.

In some embodiments, processor circuit 202 may be operative to call a runtime basic input/output system (BIOS) 220 to facilitate preservation of configuration information 222 for PCIe controller 206 and/or PCIe I/O module 208. In various embodiments, runtime BIOS 220 may be called by one or more device driver routines invoked by processor circuit 202, such as routines associated with PCIe device driver 216 or a device driver for PCIe controller 206 and/or PCIe I/O module 208. In some embodiments, configuration information 222 may comprise information indicating parameters negotiated between PCIe controller 206, PCIe I/O module 208, and/or PCIe device 250 to enable PCIe device 250 to communicate with processor circuit 202 over PCIe link 251. In various embodiments, such parameters may have been negotiated during an initial training sequence for PCIe link 251. In some embodiments, processor circuit 202 may comprise circuitry, logic, and/or instructions operative to expose configuration information 222 to software such as runtime BIOS 220 and/or PCIe device driver 216. In various embodiments, runtime BIOS 220 may be operative to access the exposed configuration information 222 for PCIe controller 206 and/or PCIe I/O module 208 and store it in memory unit 204 and/or in one or more other storage media. The embodiments are not limited in this context.

In some embodiments, since PCIe device 250 depends on the PCIe link 251 implemented by PCIe controller 206 and/or PCIe I/O module 208 to communicate with processor circuit 202, removing power from PCIe controller 206 and/or PCIe I/O module 208 may prevent processor circuit 202 from utilizing features provided by PCIe device 250. In various embodiments, processor circuit 202 and/or runtime BIOS 220 may be operative to activate an alternate device 224 in order to enable use of one or more same or similar features. Alternate device 224 may comprise a device that will be accessible to processor circuit 202 notwithstanding deactivation of PCIe controller 206 and/or PCIe I/O module 208. In some embodiments, alternate device 224 may enable use of one or more same or similar features at a reduced power consumption cost in comparison to PCIe device 250. In various embodiments, alternate device 224 may enable the one or more same or similar features at a lower level of performance and/or quality. As such, in some embodiments, utilization of alternate device 224 may involve accepting some amount of performance and/or quality reduction as a tradeoff for realized power savings.

In various embodiments, alternate device 224 may comprise an integrated device or circuitry of processor circuit 202. In an example embodiment in which PCIe device 250 comprises a graphics card, alternate device 224 may comprise integrated graphics circuitry within processor circuit 202. In some other embodiments, alternate device 224 may comprise an integrated device, chip, or circuitry on a same motherboard as processor circuit 202. In yet other embodiments, alternate device 224 may comprise a discrete card or other device with which processor circuit 202 may communicate without support from PCIe controller 206 and/or PCIe I/O module 208. In various embodiments, once activated, alternate device 224 may be operative to commence operation using some or all of the stored operating parameters 218 for PCIe device 250. In some embodiments, operating parameters 218 may comprise information associated with features previously provided by PCIe device 250 that are now to be provided by alternate device 224, and alternate device 224 may utilize the operating parameters 218 to provide those features. In the example embodiment in which PCIe device 250 comprises a graphics card and alternate device 224 comprises integrated graphics circuitry of processor circuit 202, operating parameters 218 may comprise graphics information for a graphics frame buffer, and alternate device 224 may populate the graphics frame buffer using the operating parameters 218. The embodiments are not limited to this example.

In various embodiments, processor circuit 202 may be operative to transition PCIe controller 206 to a disabled state once operating parameters 218 and/or configuration information 222 have been stored and any desired alternate device 224 has been activated. In some embodiments, PCU 210 may be operative to detect that PCIe controller 206 has transitioned into the disabled state. In various embodiments, PCU 210 may then be operative to determine whether power may be removed from PCIe controller 206 and/or PCIe I/O module 208 based on a power removal setting 226. Power removal setting 226 may comprise information indicating whether power may be removed from PCIe controller 206 and/or PCIe I/O module 208 if PCIe controller 206 is placed into the disabled state. In some embodiments, power removal setting 226 may comprise a "PCIe_power_gate_allowed" bit or other value set by a BIOS during an initial boot sequence of apparatus 200 and/or system 240. In various embodiments, power removal setting 226 may indicate whether one or more power gates 212 may be set to open states in order to remove power from PCIe controller 206 and/or PCIe I/O module 208. The embodiments are not limited in this context.

In some embodiments, when PCIe controller 206 has been disabled and power removal setting 226 indicates that power may be removed from PCIe controller 206 and/or PCIe I/O module 208, PCU 210 may be operative to remove power from PCIe controller 206 and/or PCIe I/O module 208. In various such embodiments, PCU 210 may be operative to set one or more power gates 212 to open states in order to remove power from PCIe controller 206 and/or PCIe I/O module 208. The embodiments are not limited in this context.

In some embodiments, power removal setting 226 may indicate that power may not be removed from PCIe controller 206 and/or PCIe I/O module 208. For example, in various embodiments, power removal setting 226 may comprise a PCIe_power_gate_allowed bit with a value equal to zero, indicating that PCU 210 may not set power gates 212 to remove power from PCIe controller 206 and/or PCIe I/O module 208. In some such embodiments, PCU 210 may not be operative to remove power from PCIe controller 206 and/or PCIe I/O module 208, but processor circuit 202 and/or PCU 210 may be operative to implement a reduced power state for PCIe controller 206 and/or PCIe I/O module 208. In various embodiments, for example, PCIe controller 206 may support a low power state for PCIe I/O module 208, such that when PCIe controller 206 is disabled, PCIe I/O module 208 may be placed in the low power state. In some embodiments, the low power state may comprise an L2-like state. The embodiments are not limited in this context.

In various embodiments, once PCU 210 has removed power from PCIe controller 206 and/or PCIe I/O module 208, processor circuit 202 may be operative to remove power from PCIe device 250. In some embodiments, processor circuit 202 may be operative to invoke one or more routines of PCIe device driver 216 and/or one or more other drivers in order to remove power from PCIe device 250. In various embodiments, the ability of processor circuit 202 to remove power from PCIe device 250 may depend on features supported by a motherboard on which processor circuit 202 resides and with which PCIe device 250 interfaces. In some embodiments, for example, processor circuit 202 may be operative to remove power from PCIe device 250 by powering down a PCIe slot in which PCIe device 250 resides, if the motherboard supports such an operation. Under such circumstances, in addition to the power savings achieved by removing power from PCIe controller 206 and/or PCIe I/O module 208, further power savings may be achieved by the removal of power from PCIe device 250. If the motherboard does not support removing power from PCIe device 250, PCIe device 250 may remain powered even while PCIe controller 206 and/or PCIe I/O module 208 are not powered. However, under these circumstances, the power savings associated with removing power from PCIe controller 206 and/or PCIe I/O module 208 may still be realized. The embodiments are not limited in this context.

In various embodiments, subsequent to the disabling and removal of power from PCIe controller 206 and/or PCIe I/O module 208, processor circuit 202 may be operative to detect a power increase trigger 228. In some embodiments, power increase trigger 228 may comprise information and/or signals indicating the existence of circumstances under which it may be desirable to accept the increased power consumption associated with PCIe controller 206, PCIe I/O module 208, and/or PCIe device 250 in order to utilize features provided by PCIe device 250. In an example embodiment, processor circuit 202 may be operative to detect a power increase trigger 228 indicating that an external power supply connection has been established and thus that apparatus 200 and/or system 240 are no longer running on battery power. In another example embodiment, processor circuit 202 may be operative to compare a current power consumption level with a target power consumption level, and power increase trigger 228 may comprise a result determined by processor circuit 202 and indicating that the current power consumption level is less than the target power consumption level by an amount greater than that consumed by PCIe controller 206, PCIe I/O module 208, and/or PCIe device 250. The embodiments are not limited to these examples.

In various embodiments, based on power increase trigger 228, processor circuit 202 may be operative to determine that PCIe controller 206 and/or PCIe I/O module 208 should be enabled. In some embodiments, a process for enabling PCIe controller 206 and/or PCIe I/O module 208 may begin with PCU 210 restoring power to PCIe controller 206 and/or PCIe I/O module 208. In various embodiments, PCU 210 may be operative to set one or more power gates 212 to closed states in order to provide power to PCIe controller 206 and/or PCIe I/O module 208. The embodiments are not limited in this context.

In some embodiments, once PCU 210 has provided power to PCIe controller 206 and/or PCIe I/O module 208, processor circuit 202 may be operative to call runtime BIOS 220. In various embodiments, runtime BIOS 220 may be called by one or more device driver routines invoked by processor circuit 202, such as routines associated with PCIe device driver 216 or a device driver for PCIe controller 206 and/or PCIe I/O module 208. In some embodiments, processor circuit 202 and/or runtime BIOS 220 may be operative to transition PCIe controller 206 into an enabled state, and runtime BIOS 220 may be operative to restore a configuration of PCIe controller 206 and/or PCIe I/O module 208 based on stored configuration information 222. In various embodiments, if PCIe device 250 is not currently powered, processor circuit 202 may be operative to invoke one or more routines of PCIe device driver 216 and/or one or more other drivers in order to provide power to PCIe device 250.

In some embodiments, runtime BIOS 220 may be operative to invoke a retraining sequence to restore the PCIe link 251 between processor circuit 202 and PCIe device 250. In various embodiments, the storage and retrieval of configuration information 222 may enable runtime BIOS 220 to utilize the retraining sequence to restore PCIe link 251 instead of being forced to re-perform the initial training sequence originally used to establish PCIe link 251. In some embodiments, the retraining sequence may comprise a faster and/or less computationally intensive process than the initial training sequence. As such, the storage of configuration information 222 when PCIe controller 206 is disabled may allow PCIe link 251 to be re-established more quickly and efficiently when PCIe controller 206 is re-enabled. Other advantages may be associated with various embodiments, and the embodiments are not limited in this context.

In some embodiments, processor circuit 202 may be operative to invoke one or more routines of PCIe device driver 216 that are operative to re-enable operation of PCIe device 250. In various embodiments, the one or more routines may be operative to restore an operating configuration for PCIe device 250 based on stored operating parameters 218 for PCIe device 250. In some embodiments, the one or more routines may additionally or alternatively be operative to re-enable operation of PCIe device 250 based on operating parameters 218 associated with alternate device 224. In various such embodiments, in enabling particular features of PCIe device 250, the one or more routines may utilize operating parameters 218 associated with same or similar features provided by alternate device 224. In an example embodiment in which PCIe device 250 comprises a graphics card and alternate device 224 comprises integrated graphics circuitry of processor circuit 202, the one or more routines may retrieve operating parameters 218 comprising frame buffer contents for alternate device 224 and may transfer the frame buffer contents to PCIe device 250 in the course of re-enabling PCIe device 250. In some embodiments, once renewed operation of PCIe device 250 has commenced, processor circuit 202 and/or PCU 210 may be operative to remove power from and/or disable alternate device 224. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 3:
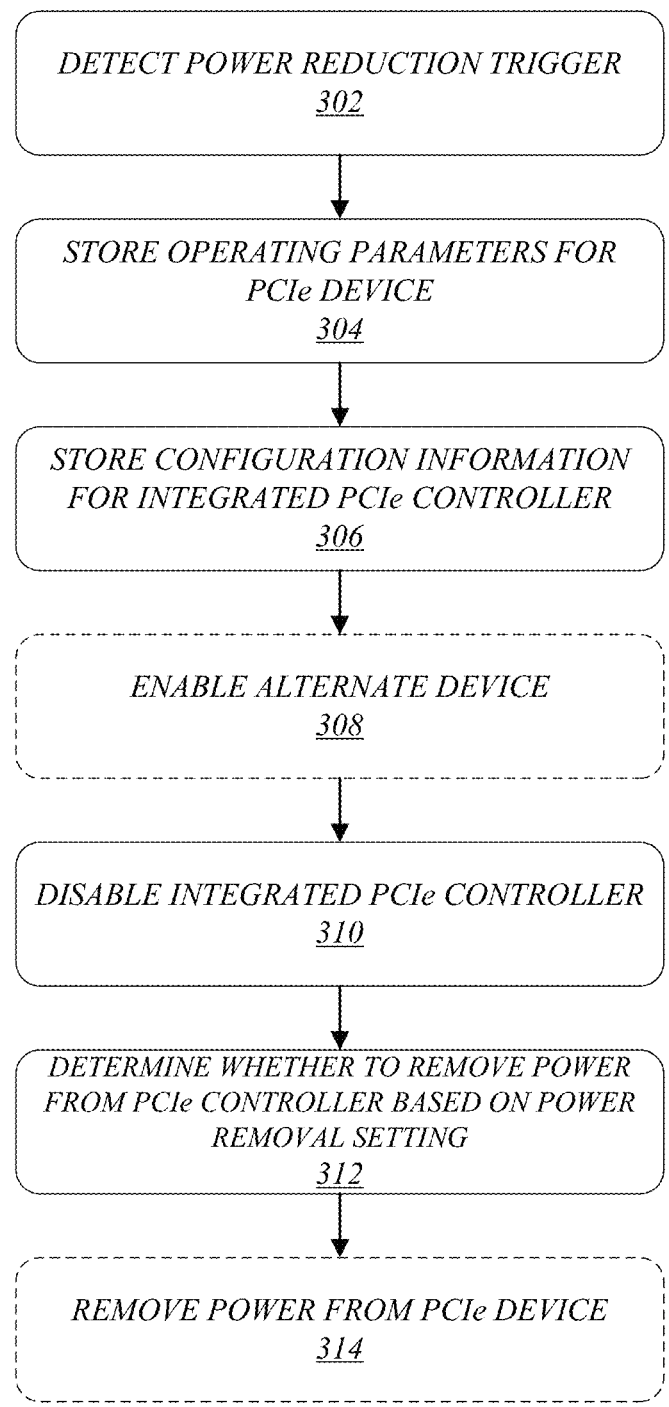
FIG. 3 illustrates one embodiment of a first logic flow.

FIG. 3 illustrates an embodiment of a logic flow 300, which may be representative of the operations executed by one or more embodiments described herein. More particularly, logic flow 300 may comprise an example of operations that may be performed at apparatus 200 and/or system 240 of FIG. 2 in conjunction with a process for removing power from PCIe controller 206 and/or PCIe I/O module 208. In various embodiments, processor circuit 202, memory unit 204, PCIe controller 206, PCIe I/O module 208, PCU 210, power gates 212, apparatus 200, and/or system 240 of FIG. 2 may comprise logic to perform one or more of the operations of logic flow 300. In some embodiments, at least a portion of the logic to perform one or more of the operations of logic flow 300 may be in hardware.

As shown in logic flow 300, a power reduction trigger may be detected at 302. For example, processor circuit 202 of FIG. 2 may be operative to detect a power reduction trigger 214. At 304, operating parameters for a PCIe device may be stored. For example, processor circuit 202 of FIG. 2 may be operative to invoke one or more routines of PCIe device driver 216 to store operating parameters 218 for PCIe device 250 in memory unit 204. At 306, configuration information for an integrated PCIe controller may be stored. For example, runtime BIOS 220 of FIG. 2 may be operative to store configuration information 222 for the integrated PCIe controller 206 within processor circuit 202. In various embodiments, configuration information for an associated PCIe I/O module may also be stored. For example, runtime BIOS 220 of FIG. 2 may also be operative to store configuration information 222 for PCIe I/O module 208.

At 308, if an alternate device is to be utilized in lieu of the PCIe device, the alternate device may be activated. For example, if alternate device 224 of FIG. 2 is to be utilized in lieu of PCIe device 250, processor circuit 202 and/or runtime BIOS 220 may be operative to activate alternate device 224. In some embodiments, no alternate device may be utilized in lieu of the PCIe device, and thus operation 308 is depicted with a dashed line border. At 310, the integrated PCIe controller may be disabled. For example, processor circuit 202 of FIG. 2 may be operative to transition PCIe controller 206 into a disabled state. In various embodiments, a PCIe I/O module associated with the integrated PCIe controller may also be disabled. For example, processor circuit 202 of FIG. 2 may also be operative to transition PCIe I/O module 208 into a disabled state.

At 312, it may be determined, based on a power removal setting, whether to remove power from the integrated PCIe controller. Power may be removed from the integrated PCIe controller if the power removal setting indicates that power may be removed. For example, PCU 210 of FIG. 2 may be operative to detect that PCIe controller 206 has been disabled, determine that power removal setting 226 comprises a PCIe_power_gate_allowed bit indicating that power may be removed from PCIe controller 206, and set a power gate 212 to an open state in order to remove power from PCIe controller 206. In some embodiments, it may also be determined, based on the power removal setting, whether to remove power from a PCIe I/O module associated with the integrated PCIe controller. For example, PCU 210 of FIG. 2 may also be operative to set a power gate 212 to an open state in order to remove power from PCIe I/O module 208, based on the value of the PCIe_power_gate_allowed bit.

At 314, power may be removed from the PCIe device. For example, processor circuit 202 of FIG. 2 may be operative to remove power from PCIe device 250 by powering down a PCIe slot in which PCIe device 250 resides. In various embodiments, the PCIe device may interface with a motherboard that does not support powering down its PCIe slot, and thus the PCIe device may remain in a powered state. For this reason, operation 314 is depicted with a dashed line border. The embodiments are not limited to the above examples.

Figure 4:
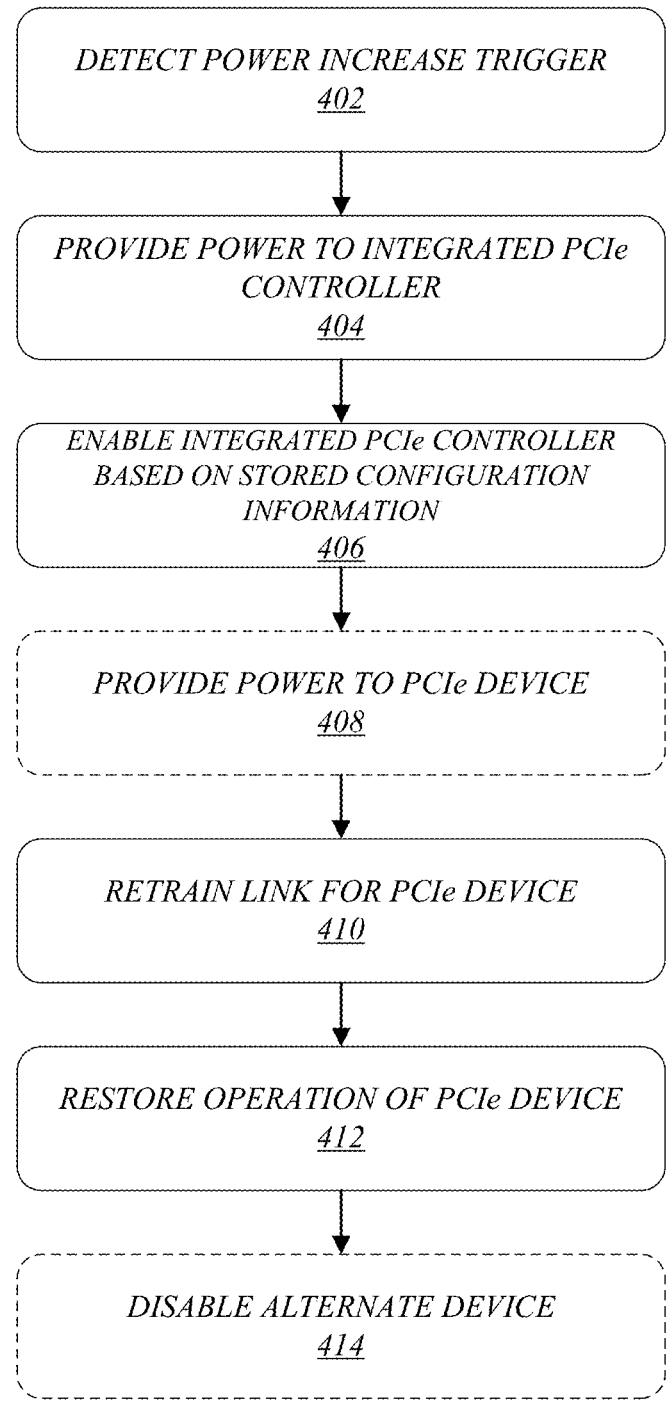
FIG. 4 illustrates one embodiment of a second logic flow.

FIG. 4 illustrates an embodiment of a logic flow 400, which may be representative of the operations executed by one or more embodiments described herein. More particularly, logic flow 400 may comprise an example of operations that may be performed at apparatus 200 and/or system 240 of FIG. 2 in conjunction with a process for re-enabling PCIe controller 206 and/or PCIe I/O module 208. In some embodiments, one or more of processor circuit 202, memory unit 204, PCIe controller 206, PCIe I/O module 208, PCU 210, power gates 212, apparatus 200, and/or system 240 of FIG. 2 may comprise logic to perform one or more of the operations of logic flow 400. In various embodiments, at least a portion of the logic to perform one or more of the operations of logic flow 400 may be in hardware.

As shown in logic flow 400, a power increase trigger may be detected at 402. For example, processor circuit 202 of FIG. 2 may be operative to detect a power increase trigger 228. At 404, power may be provided to the integrated PCIe controller. For example, in response to power increase trigger 228, PCU 210 of FIG. 2 may be operative to set a power gate 212 to a closed state in order to provide power to PCIe controller 206. In some embodiments, power may also be provided to a PCIe I/O module associated with the integrated PCIe controller. For example, PCU 210 of FIG. 2 may also be operative to set a power gate 212 to a closed state in order to provide power to PCIe I/O module 208.

At 406, the integrated PCIe controller may be enabled based on stored configuration information. For example, runtime BIOS 220 of FIG. 2 may be operative to retrieve stored configuration information 222 for PCIe controller 206, and processor circuit 202 may be operative to enable PCIe controller 206 based on the configuration information 222 for PCIe controller 206. In various embodiments, a PCIe I/O module associated with the integrated PCIe controller may also be enabled based on stored configuration information. For example, runtime BIOS 220 of FIG. 2 may also be operative to retrieve stored configuration information 222 for PCIe I/O module 208, and processor circuit 202 may also be operative to enable PCIe I/O module 208 based on the configuration information 222 for PCIe I/O module 208. At 408, if a PCIe device to be controlled by the integrated PCIe controller is not currently powered, power may be provided to the PCIe device. For example, if a PCIe slot for PCIe device 250 of FIG. 2 was previously powered down, processor circuit 202 may be operative to invoke one or more driver routines to restore power to the PCIe slot and thus to PCIe device 250. In some embodiments, the PCIe device may already be in a powered state, and thus operation 408 is depicted with a dashed line border.

At 410, a link for the PCIe device may be retrained. For example, runtime BIOS 220 of FIG. 2 may be operative to invoke a retraining sequence to restore PCIe link 251 between processor circuit 202 and PCIe device 250. At 412, operation of the PCIe device may be restored. For example, processor circuit 202 of FIG. 2 may be operative to invoke one or more routines of PCIe device driver 216 that are operative to re-enable operation of PCIe device 250. In various embodiments, operation of the PCIe device may be restored based on stored operating parameters for the PCIe device. For example, processor circuit 202 of FIG. 202 may be operative to invoke one or more routines of PCIe device driver 216 that are operative to re-enable operation of PCIe device 250 based on stored operating parameters 218 for PCIe device 250. At 414, if an alternate device was utilized in lieu of the PCIe device, the alternate device may be disabled. For example, if alternate device 224 of FIG. 2 was utilized in lieu of PCIe device 250, processor circuit 202 may be operative to disable alternate device 224. In some embodiments, no alternate device may have been utilized in lieu of PCIe device 250, and thus operation 414 is depicted with a dashed line border. The embodiments are not limited to the above examples.

FIG. 5 illustrates an embodiment of a storage medium 500. Storage medium 500 may comprise any non-transitory computer-readable storage medium or machine-readable storage medium, such as an optical, magnetic or semiconductor storage medium. In various embodiments, storage medium 500 may comprise an article of manufacture. In some embodiments, storage medium 500 may store computer-executable instructions, such as computer-executable instructions to implement logic flow 300 of FIG. 3 and/or logic flow 400 of FIG. 4. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 6:
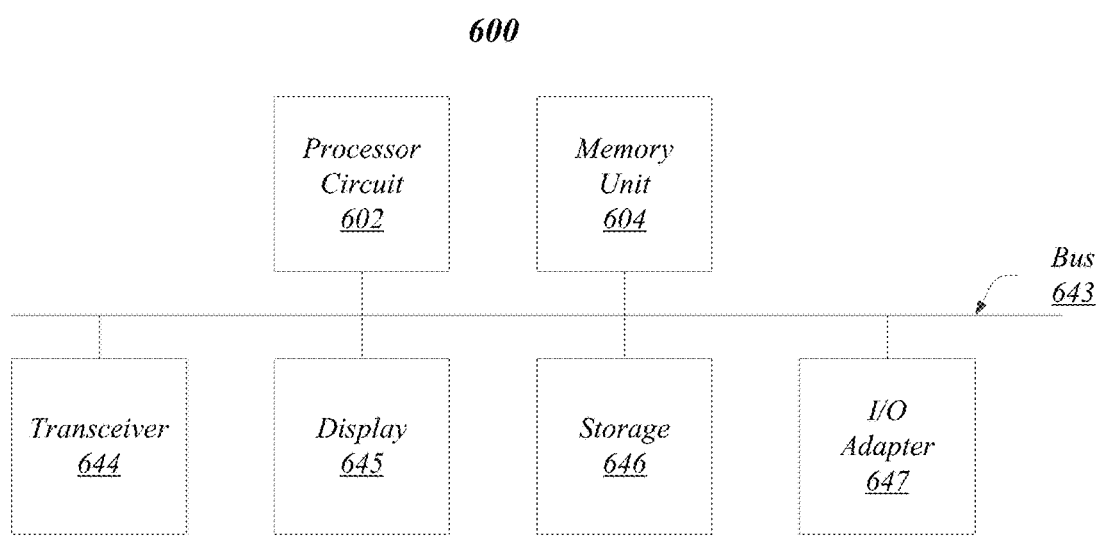
FIG. 6 illustrates one embodiment of a second system.

FIG. 6 illustrates one embodiment of a system 600. In various embodiments, system 600 may be representative of a system or architecture suitable for use with one or more embodiments described herein, such as apparatus 200 and/or system 240 of FIG. 2, logic flow 300 of FIG. 3, logic flow 400 of FIG. 4, and/or storage medium 500 of FIG. 5. The embodiments are not limited in this respect.

As shown in FIG. 6, system 600 may include multiple elements. One or more elements may be implemented using one or more circuits, components, registers, processors, software subroutines, modules, or any combination thereof, as desired for a given set of design or performance constraints. Although FIG. 6 shows a limited number of elements in a certain topology by way of example, it can be appreciated that more or less elements in any suitable topology may be used in system 600 as desired for a given implementation. The embodiments are not limited in this context.

In various embodiments, system 600 may include a processor circuit 602. Processor circuit 602 may be implemented using any processor or logic device, and may be the same as or similar to processor circuit 202 of FIG. 2.

In one embodiment, system 600 may include a memory unit 604 to couple to processor circuit 602. Memory unit 604 may be coupled to processor circuit 602 via communications bus 643, or by a dedicated communications bus between processor circuit 602 and memory unit 604, as desired for a given implementation. Memory unit 604 may be implemented using any machine-readable or computer-readable media capable of storing data, including both volatile and non-volatile memory, and may be the same as or similar to memory unit 204 of FIG. 2. In some embodiments, the machine-readable or computer-readable medium may include a non-transitory medium. The embodiments are not limited in this context.

In various embodiments, system 600 may include a radio frequency (RF) transceiver 644. RF transceiver 644 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, RF transceiver 644 may operate in accordance with one or more applicable standards in any version. The embodiments are not limited in this context.

In various embodiments, system 600 may include a display 645. Display 645 may comprise any display device capable of displaying information received from processor circuit 602. Examples for display 645 may include a television, a monitor, a projector, and a computer screen. In one embodiment, for example, display 645 may be implemented by a liquid crystal display (LCD), light emitting diode (LED) or other type of suitable visual interface. Display 645 may comprise, for example, a touch-sensitive display screen ("touchscreen"). In various implementations, display 645 may comprise one or more thin-film transistors (TFT) LCD including embedded transistors. The embodiments are not limited in this context.

In various embodiments, system 600 may include storage 646. Storage 646 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 646 may include technology to increase the storage performance enhanced protection for valuable digital media when multiple hard drives are included, for example. Further examples of storage 646 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 600 may include one or more I/O adapters 647. Examples of I/O adapters 647 may include Universal Serial Bus (USB) ports/adapters, IEEE 1394 Firewire ports/adapters, and so forth. The embodiments are not limited in this context.

Figure 7:
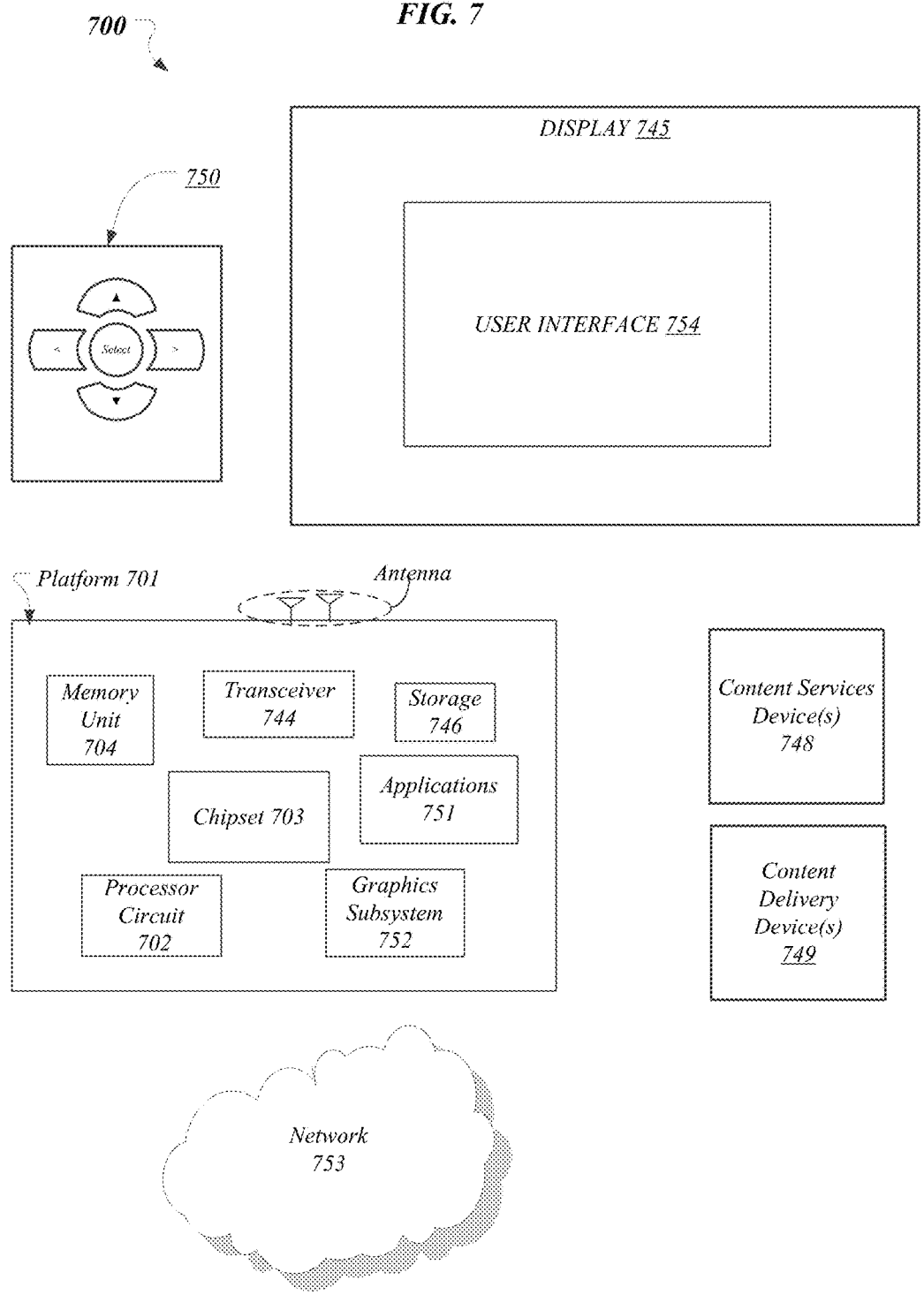
FIG. 7 illustrates one embodiment of a third system.

FIG. 7 illustrates an embodiment of a system 700. In various embodiments, system 700 may be representative of a system or architecture suitable for use with one or more embodiments described herein, such as apparatus 200 and/or system 240 of FIG. 2, logic flow 300 of FIG. 3, logic flow 400 of FIG. 4, storage medium 500 of FIG. 5, and/or system 600 of FIG. 6. The embodiments are not limited in this respect.

As shown in FIG. 7, system 700 may include multiple elements. One or more elements may be implemented using one or more circuits, components, registers, processors, software subroutines, modules, or any combination thereof, as desired for a given set of design or performance constraints. Although FIG. 7 shows a limited number of elements in a certain topology by way of example, it can be appreciated that more or less elements in any suitable topology may be used in system 700 as desired for a given implementation. The embodiments are not limited in this context.

In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 includes a platform 701 coupled to a display 745. Platform 701 may receive content from a content device such as content services device(s) 748 or content delivery device(s) 749 or other similar content sources. A navigation controller 750 including one or more navigation features may be used to interact with, for example, platform 701 and/or display 745. Each of these components is described in more detail below.

In embodiments, platform 701 may include any combination of a processor circuit 702, chipset 703, memory unit 704, transceiver 744, storage 746, applications 751, and/or graphics subsystem 752. Chipset 703 may provide intercommunication among processor circuit 702, memory unit 704, transceiver 744, storage 746, applications 751, and/or graphics subsystem 752. For example, chipset 703 may include a storage adapter (not depicted) capable of providing intercommunication with storage 746.

Processor circuit 702 may be implemented using any processor or logic device, and may be the same as or similar to processor circuit 602 in FIG. 6.

Memory unit 704 may be implemented using any machine-readable or computer-readable media capable of storing data, and may be the same as or similar to memory unit 604 in FIG. 6.

Transceiver 744 may include one or more radios capable of transmitting and receiving signals using various suitable wireless communications techniques, and may be the same as or similar to transceiver 644 in FIG. 6.

Display 745 may include any television type monitor or display, and may be the same as or similar to display 645 in FIG. 6.

Storage 746 may be implemented as a non-volatile storage device, and may be the same as or similar to storage 646 in FIG. 6.

Graphics subsystem 752 may perform processing of images such as still or video for display. Graphics subsystem 752 may be a graphics processing unit (GPU) or a visual processing unit (VPU), for example. An analog or digital interface may be used to communicatively couple graphics subsystem 752 and display 745. For example, the interface may be any of a High-Definition Multimedia Interface, DisplayPort, wireless HDMI, and/or wireless HD compliant techniques. Graphics subsystem 752 could be integrated into processor circuit 702 or chipset 703. Graphics subsystem 752 could be a stand-alone card communicatively coupled to chipset 703.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 748 may be hosted by any national, international and/or independent service and thus accessible to platform 701 via the Internet, for example. Content services device(s) 748 may be coupled to platform 701 and/or to display 745. Platform 701 and/or content services device(s) 748 may be coupled to a network 753 to communicate (e.g., send and/or receive) media information to and from network 753. Content delivery device(s) 749 also may be coupled to platform 701 and/or to display 745.

In embodiments, content services device(s) 748 may include a cable television box, personal computer, network, telephone, Internet enabled devices or appliance capable of delivering digital information and/or content, and any other similar device capable of unidirectionally or bidirectionally communicating content between content providers and platform 701 and/display 745, via network 753 or directly. It will be appreciated that the content may be communicated unidirectionally and/or bidirectionally to and from any one of the components in system 700 and a content provider via network 753. Examples of content may include any media information including, for example, video, music, medical and gaming information, and so forth.

Content services device(s) 748 receives content such as cable television programming including media information, digital information, and/or other content. Examples of content providers may include any cable or satellite television or radio or Internet content providers. The provided examples are not meant to limit embodiments of the disclosed subject matter.

In embodiments, platform 701 may receive control signals from navigation controller 750 having one or more navigation features. The navigation features of navigation controller 750 may be used to interact with a user interface 754, for example. In embodiments, navigation controller 750 may be a pointing device that may be a computer hardware component (specifically human interface device)

that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 750 may be echoed on a display (e.g., display 745) by movements of a pointer, cursor, focus ring, or other visual indicators displayed on the display. For example, under the control of software applications 751, the navigation features located on navigation controller 750 may be mapped to virtual navigation features displayed on user interface 754. In embodiments, navigation controller 750 may not be a separate component but integrated into platform 701 and/or display 745. Embodiments, however, are not limited to the elements or in the context shown or described herein.

In embodiments, drivers (not shown) may include technology to enable users to instantly turn on and off platform 701 like a television with the touch of a button after initial boot-up, when enabled, for example. Program logic may allow platform 701 to stream content to media adaptors or other content services device(s) 748 or content delivery device(s) 749 when the platform is turned "off." In addition, chip set 703 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 700 may be integrated. For example, platform 701 and content services device(s) 748 may be integrated, or platform 701 and content delivery device(s) 749 may be integrated, or platform 701, content services device(s) 748, and content delivery device(s) 749 may be integrated, for example. In various embodiments, platform 701 and display 745 may be an integrated unit. Display 745 and content service device(s) 748 may be integrated, or display 745 and content delivery device(s) 749 may be integrated, for example. These examples are not meant to limit the disclosed subject matter.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 701 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
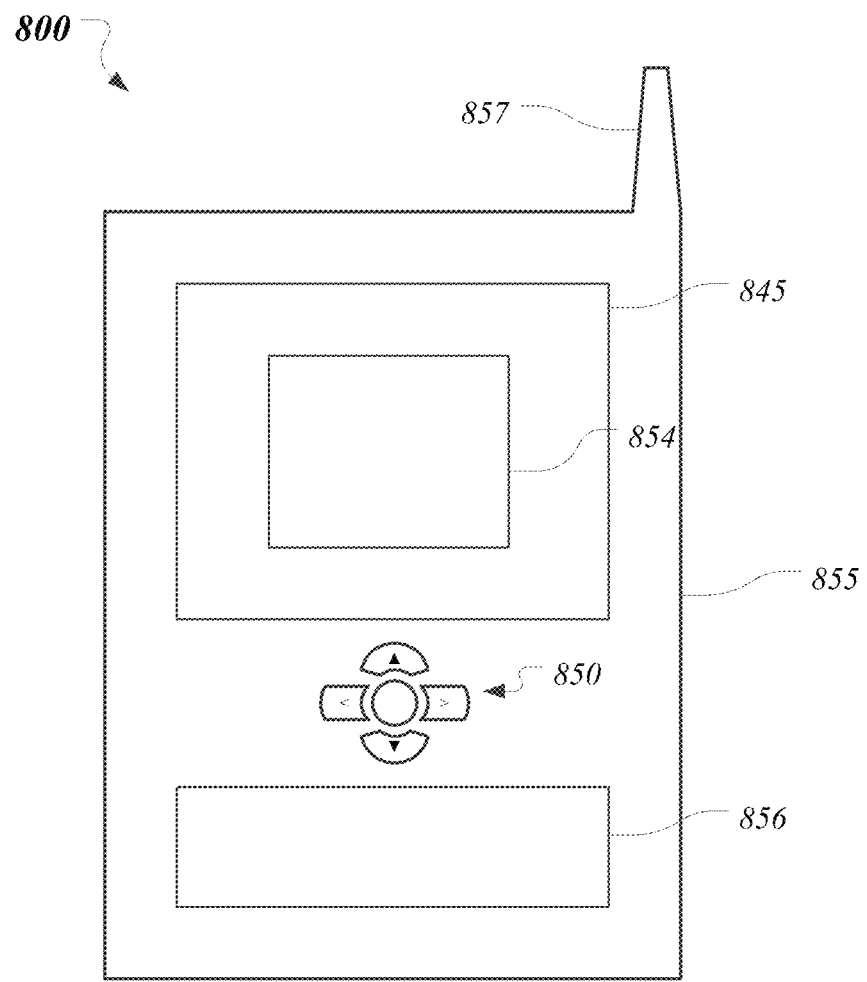
FIG. 8 illustrates one embodiment of a device.

As described above, system 700 may be embodied in varying physical styles or form factors. FIG. 8 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may include a display 845, a navigation controller 850, a user interface 854, a housing 855, an I/O device 856, and an antenna 857. Display 845 may include any suitable display unit for displaying information appropriate for a mobile computing device, and may be the same as or similar to display 745 in FIG. 7. Navigation controller 850 may include one or more navigation features which may be used to interact with user interface 854, and may be the same as or similar to navigation controller 750 in FIG. 7. I/O device 856 may include any suitable I/O device for entering information into a mobile computing device. Examples for I/O device 856 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is a processor circuit, comprising: an integrated peripheral component interconnect express (PCIe) controller; and logic, at least a portion of which is in hardware, the logic to detect a power reduction trigger, disable the integrated PCIe controller, and remove power from the integrated PCIe controller based on a power removal setting for the integrated PCIe controller.

In Example 2, the processor circuit of Example 1 may optionally comprise logic to store configuration information for the integrated PCIe controller.

In Example 3, the processor circuit of any one of Examples 1 to 2 may optionally comprise logic to remove power from the integrated PCIe controller by setting a power gate for the integrated PCIe controller to an open state.

In Example 4, the power reduction trigger of any one of Examples 1 to 3 may optionally indicate that a connection to an external power supply has been removed.

In Example 5, the processor circuit of any one of Examples 1 to 4 may optionally comprise logic to disable a PCIe graphics card communicating with the processor circuit over a PCIe link and activate integrated graphics circuitry of the processor circuit.

In Example 6, the power removal setting of any one of Examples 1 to 5 may optionally comprise a bit set by a basic input/output system (BIOS) during an initial boot sequence.

In Example 7, the processor circuit of any one of Examples 1 to 6 may optionally comprise logic to transition the processor circuit into a lower power state after removing power from the integrated PCIe controller.

In Example 8, the processor circuit of any one of Examples 1 to 7 may optionally comprise a PCIe input/output (I/O) module, and the logic may optionally disable the PCIe I/O module.

In Example 9, the processor circuit of Example 8 may optionally comprise logic to remove power from the PCIe I/O module when the power removal setting indicates that power may be removed from the PCIe I/O module, and place the PCIe I/O module into a low power state when the power removal setting indicates that power may not be removed from the PCIe I/O module.

Example 10 is a computing device, comprising: a processor circuit comprising an integrated peripheral component interconnect express (PCIe) controller to control a PCIe link; an integrated device; and logic, at least a portion of which is in hardware, the logic to detect a power reduction trigger, activate the integrated device, disable the integrated PCIe controller, and remove power from the integrated PCIe controller based on a power removal setting for the integrated PCIe controller.

In Example 11, the computing device of Example 10 may optionally comprise a memory unit, and the logic may optionally store configuration information for the integrated PCIe controller in the memory unit.

In Example 12, the computing device of any one of Examples 10 to 11 may optionally comprise logic to remove power from the integrated PCIe controller by setting a power gate for the integrated PCIe controller to an open state.

In Example 13, the power reduction trigger of any one of Examples 10 to 12 may optionally indicate that a connection to an external power supply has been removed.

In Example 14, the processor circuit of any one of Examples 10 to 13 may optionally communicate with a PCIe device over the PCIe link, and the logic may optionally disable the PCIe device and activate the integrated device.

In Example 15, the power removal setting of any one of Examples 10 to 14 may optionally comprise a bit set by a basic input/output system (BIOS) during an initial boot sequence.

In Example 16, the computing device of any one of Examples 10 to 15 may optionally comprise logic to transition the processor circuit into a lower power state after removing power from the integrated PCIe controller.

In Example 17, the processor circuit of any one of Examples 10 to 16 may optionally comprise a PCIe input/output (I/O) module, and the logic may optionally disable the PCIe I/O module.

In Example 18, the computing device of Example 17 may optionally comprise logic to remove power from the PCIe I/O module when the power removal setting indicates that power may be removed from the PCIe I/O module, and place the PCIe I/O module into a low power state when the power removal setting indicates that power may not be removed from the PCIe I/O module.

Example 19 is a system, comprising: a computing device according to any one of Examples 10 to 18; a display; and one or more RF transceivers.

Example 20 is at least one machine-readable medium comprising a set of power control instructions that, in response to being executed on a computing device, cause the computing device to: detect a power reduction trigger; disable an integrated peripheral component interconnect express (PCIe) controller of a processor circuit; and remove power from the integrated PCIe controller based on a power removal setting for the integrated PCIe controller.

In Example 21, the at least one machine-readable medium of Example 20 may optionally comprise power control instructions that, in response to being executed on the computing device, cause the computing device to store configuration information for the integrated PCIe controller in a memory unit.

In Example 22, the at least one machine-readable medium of any one of Examples 20 to 21, may optionally comprise power control instructions that, in response to being executed on the computing device, cause the computing device to remove power from the integrated PCIe controller by setting a power gate for the integrated PCIe controller to an open state.

In Example 23, the power reduction trigger of any one of Examples 20 to 22 may optionally indicate that a connection of the computing device to an external power supply has been removed.

In Example 24, the at least one machine-readable medium of any one of Examples 20 to 23 may optionally comprise power control instructions that, in response to being executed on the computing device, cause the computing device to disable a PCIe graphics card communicating with the processor circuit over a PCIe link and activate integrated graphics circuitry of the processor circuit.

In Example 25, the power removal setting of any one of Examples 20 to 24 may optionally comprise a bit set by a basic input/output system (BIOS) during an initial boot sequence of the computing device.

In Example 26, the at least one machine-readable medium of any one of Examples 20 to 25 may optionally comprise power control instructions that, in response to being executed on the computing device, cause the computing device to transition the processor circuit into a lower power state after removing power from the integrated PCIe controller.

In Example 27, the at least one machine-readable medium of any one of Examples 20 to 26 may optionally comprise power control instructions that, in response to being executed on the computing device, cause the computing device to disable a PCIe input/output (I/O) module.

In Example 28, the at least one machine-readable medium of Example 27 may optionally comprise power control instructions that, in response to being executed on the computing device, cause the computing device to remove power from the PCIe I/O module when the power removal setting indicates that power may be removed from the PCIe I/O module, and place the PCIe I/O module into a low power state when the power removal setting indicates that power may not be removed from the PCIe I/O module.

Example 29 is a power control method, comprising: detecting, by a processor circuit, a power reduction trigger; disabling an integrated peripheral component interconnect express (PCIe) controller of the processor circuit; and removing power from the integrated PCIe controller based on a power removal setting for the integrated PCIe controller.

In Example 30, the power control method of Example 29 may optionally comprise storing configuration information for the integrated PCIe controller in a memory unit.

In Example 31, the power control method of any one of Examples 29 to 30 may optionally comprise removing power from the integrated PCIe controller by setting a power gate for the integrated PCIe controller to an open state.

In Example 32, the power reduction trigger of any one of Example 29 to 31 may optionally indicate that a connection to an external power supply has been removed.

In Example 33, the power control method of any one of Examples 29 to 32 may optionally comprise disabling a PCIe graphics card communicating with the processor circuit over a PCIe link and activating integrated graphics circuitry of the processor circuit.

In Example 34, the power removal setting of any one of Examples 29 to 33 may optionally comprise a bit set by a basic input/output system (BIOS) during an initial boot sequence of a computing device.

In Example 35, the power control method of any one of Examples 29 to 34 may optionally comprise transitioning the processor circuit into a lower power state after removing power from the integrated PCIe controller.

In Example 36, the power control method of any one of Examples 29 to 35 may optionally comprise disabling a PCIe input/output (I/O) module.

In Example 37, the power control method of Example 36 may optionally comprise removing power from the PCIe I/O module when the power removal setting indicates that power may be removed from the PCIe I/O module, and placing the PCIe I/O module into a low power state when the power removal setting indicates that power may not be removed from the PCIe I/O module.

Example 38 is an apparatus, comprising means for performing a power control method according to any one of Examples 29 to 37.

Example 39 is a system, comprising: an apparatus according to Example 38; and a display.

Example 40 is a system, comprising: an apparatus according to Example 38; and one or more radio frequency (RF) transceivers.

Example 41 is a communications device arranged to perform a power control method according to any one of Examples 29 to 37.

Example 42 is a computing device, comprising: means for detecting a power reduction trigger; means for disabling an integrated peripheral component interconnect express (PCIe) controller of a processor circuit; and means for removing power from the integrated PCIe controller based on a power removal setting for the integrated PCIe controller.

In Example 43, the computing device of Example 42 may optionally comprise means for storing configuration information for the integrated PCIe controller.

In Example 44, the computing device of any one of Examples 42 to 43 may optionally comprise means for removing power from the integrated PCIe controller by setting a power gate for the integrated PCIe controller to an open state.

In Example 45, the power reduction trigger of any one of Examples 42 to 44 may optionally indicate that a connection to an external power supply has been removed.

In Example 46, the computing device of any one of Examples 42 to 45 may optionally comprise means for disabling a PCIe graphics card communicating with the processor circuit over a PCIe link and activating integrated graphics circuitry of the processor circuit.

In Example 47, the power removal setting of any one of Examples 42 to 46 may optionally comprise a bit set by a basic input/output system (BIOS) during an initial boot sequence of a computing device.

In Example 48, the computing device of any one of Examples 42 to 47 may optionally comprise means for transitioning the processor circuit into a lower power state after removing power from the integrated PCIe controller.

In Example 49, the computing device of any one of Examples 42 to 48 may optionally comprise means for disabling a PCIe input/output (I/O) module.

In Example 50, the computing device of Example 49 may optionally comprise means for removing power from the PCIe I/O module when the power removal setting indicates that power may be removed from the PCIe I/O module, and means for placing the PCIe I/O module into a low power state when the power removal setting indicates that power may not be removed from the PCIe I/O module.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A processor circuit, comprising:
an integrated peripheral component interconnect express (PCIe) controller; and
logic, at least a portion of which is in hardware, the logic to detect a power reduction trigger, disable the integrated PCIe controller, and remove power from the integrated PCIe controller based on a power removal setting for the integrated PCIe controller.

2. The processor circuit of claim 1, the logic to store configuration information for the integrated PCIe controller.

3. The processor circuit of claim 1, the logic to remove power from the integrated PCIe controller by setting a power gate for the integrated PCIe controller to an open state.

4. The processor circuit of claim 1, the power reduction trigger indicating that a connection to an external power supply has been removed.

5. The processor circuit of claim 1, the logic to disable a PCIe graphics card communicating with the processor circuit over a PCIe link and activate integrated graphics circuitry of the processor circuit.

6. The processor circuit of claim 1, the power removal setting comprising a bit set by a basic input/output system (BIOS) during an initial boot sequence.

7. The processor circuit of claim 1, the logic to transition the processor circuit into a lower power state after removing power from the integrated PCIe controller.

8. The processor circuit of claim 1, comprising a PCIe input/output (I/O) module, the logic to disable the PCIe I/O module.

9. The processor circuit of claim 8, the logic to remove power from the PCIe I/O module when the power removal setting indicates that power may be removed from the PCIe I/O module, and place the PCIe I/O module into a low power state when the power removal setting indicates that power may not be removed from the PCIe I/O module.

10. An apparatus, comprising:
a processor circuit comprising an integrated peripheral component interconnect express (PCIe) controller to control a PCIe link;
an integrated device; and
logic, at least a portion of which is in hardware, the logic to detect a power reduction trigger, activate the integrated device, disable the integrated PCIe controller, and remove power from the integrated PCIe controller based on a power removal setting for the integrated PCIe controller.

11. The apparatus of claim 10, comprising a memory unit, the logic to store configuration information for the integrated PCIe controller in the memory unit.

12. The apparatus of claim 10, the logic to remove power from the integrated PCIe controller by setting a power gate for the integrated PCIe controller to an open state.

13. The apparatus of claim 10, the power reduction trigger indicating that a connection to an external power supply has been removed.

14. The apparatus of claim 10, the processor circuit to communicate with a PCIe device over the PCIe link, the logic to disable the PCIe device and activate the integrated device.

15. The apparatus of claim 10, the power removal setting comprising a bit set by a basic input/output system (BIOS) during an initial boot sequence.

16. The apparatus of claim 10, the logic to transition the processor circuit into a lower power state after removing power from the integrated PCIe controller.

17. The apparatus of claim 10, the processor circuit comprising a PCIe input/output (I/O) module, the logic to disable the PCIe I/O module.

18. The apparatus of claim 17, the logic to remove power from the PCIe I/O module when the power removal setting indicates that power may be removed from the PCIe I/O module, and place the PCIe I/O module into a low power state when the power removal setting indicates that power may not be removed from the PCIe I/O module.

19. The apparatus of claim 10, comprising a display and one or more RF transceivers.

20. At least one non-transitory machine-readable medium comprising a set of instructions that, in response to being executed on a computing device, cause the computing device to:
detect a power reduction trigger;
disable an integrated peripheral component interconnect express (PCIe) controller of a processor circuit; and
remove power from the integrated PCIe controller based on a power removal setting for the integrated PCIe controller.

21. The at least one non-transitory machine-readable medium of claim 20, comprising instructions that, in response to being executed on the computing device, cause the computing device to store configuration information for the integrated PCIe controller in a memory unit.

22. The at least one non-transitory machine-readable medium of claim 20, comprising instructions that, in response to being executed on the computing device, cause the computing device to remove power from the integrated PCIe controller by setting a power gate for the integrated PCIe controller to an open state.

23. The at least one non-transitory machine-readable medium of claim 20, the power reduction trigger indicating that a connection of the computing device to an external power supply has been removed.

24. The at least one non-transitory machine-readable medium of claim 20, comprising instructions that, in response to being executed on the computing device, cause the computing device to disable a PCIe graphics card communicating with the processor circuit over a PCIe link and activate integrated graphics circuitry of the processor circuit.

25. The at least one non-transitory machine-readable medium of claim 20, the power removal setting comprising a bit set by a basic input/output system (BIOS) during an initial boot sequence of the computing device.

* * * * *